Patented Dec. 6, 1949

2,490,372

UNITED STATES PATENT OFFICE 2,490,372

METHODS OF PREPARING POLYMERIC MATERIALS FROM ISOPROPENYL TOLUENE

Arthur S. Nyquist, Cos Cob, and Edward L. Kropa, Old Greenwich, Conn., assignors to American Cyanamid Company, New York, N. Y., a corporation of Maine No Drawing. Application December 7, 1946, Serial No. 714,914

10 Claims. (Cl. 260—45.5)

This application is a continuation-in-part of our copending application Serial No. 445,640, filed June 3, 1942, now abandoned.

This invention relates to methods of preparing polymeric materials from isopropenyl toluene. More particularly it is concerned with the method or process of preparing polymeric materials which comprises polymerizing a polymerizable composition containing an isopropenyl toluene, more particularly ortho-, meta- or para-isopropenyl toluene, in the absence of a terpene, with the aid of a catalyst at a temperature not higher than about 110° C., more particularly at a temperature within the range of —80° to +110° C. The isopropenyl toluene is the only aromatic compound having an unsaturated aliphatic substituent attached to the aromatic nucleus which is present in the aforesaid polymerizable composition. The catalyst for the polymerization can be a seed obtained by treating an isopropenyl toluene, e. g., p-isopropenyl toluene, with a catalyst selected from the class consisting of boron fluoride and complexes of boron fluoride, e. g., a boron fluoride-ethyl ether complex.

The products of the methods of the present invention include polymeric materials characterized by a crystalline form when examined by X-ray diffraction methods and which result when, for example, a polymerizable composition in which an isopropenyl toluene, specifically p-isopropenyl toluene, is the sole polymerizable monomer is polymerized with the aid of a seed catalyst for the reaction, such as is described in the preceding paragraph, at a temperature not higher than about 0° C., more particularly at a temperature within the range of about 0° to about —80° C. Other products of the methods of this invention include polymeric materials resulting from conjoint polymerization and ring-addition reactions between ingredients consisting of an isopropenyl toluene, specifically p-isopropenyl toluene, and another material which is a polystyrene, more particularly polymerized styrene; as well as products resulting from copolymerization of (1) an unsaturated aliphatic hydrocarbon, more particularly an isoölefin and speciafically isobutylene, and (2) an isopropenyl toluene, more particularly p-isopropenyl toluene.

The present invention is based on our discovery that polymeric materials having new and unobvious properties, and which are particularly suitable for use in the plastics, coating and electrically insulating arts, can be prepared by treating an isopropenyl toluene alone or while admixed with certain other materials as hereinbefore described. By controlling the temperature of the reaction so that all or substantially all of the polymerization is effected at a temperature not exceeding about 0° C., preferably below about —20° C., we have discovered that a substantial yield of polymeric material having a crystalline form when examined by X-ray diffraction methods results. To the best of our knowledge and belief it was not known prior to our invention that a polymeric isopropenyl toluene could be obtained in a crystalline form or that it could be produced in such form and in a substantial yield by treating the monomeric material with a catalyst of the kind herein described at a relatively low temperature, more particularly at a temperature substantially below about 0° C., preferably below about —20° C., e. g., from about —40° to about —80° C. or lower.

When an isopropenyl toluene, specifically p-isopropenyl toluene, is polymerized with boron fluoride or a complex of boron fluoride as a catalyst, a linear polymer results. The reaction may be illustrated by the following equation, wherein the isopropenyl toluene is shown as being p-isopropenyl toluene:

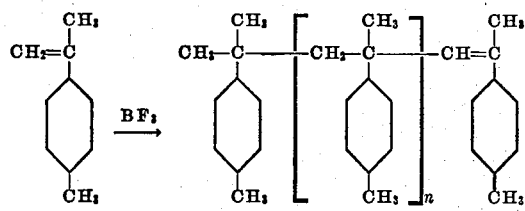

In the above equation $n$ has a value ranging from 0, in which case the formula represents a dimer, to 50 or 100 or more, or even as much as 500 or 1000 or thereabove. When an isopropenyl toluene, e. g., p-isopropenyl toluene, is treated with sulfuric acid the initially formed dimer rearranges to yield a completely saturated product which may be represented by the following formula:

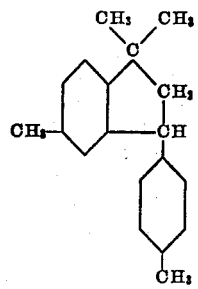

Similar saturated compounds are formed whenever other strong alkylation catalysts, e. g., aluminum chloride, are employed.

In practicing our invention the polymerization of the isopropenyl toluene can be made to occur in solution or in bulk. For conducting polymerization at low temperatures in solution, it is preferable to use inert solvents, e. g., hydrocarbons, which remain liquid during polymerization. The preferred solvents are liquid saturated aliphatic hydrocarbons or aromatic hydrocarbons that remain in liquid state at the polymerization temperature. Since the isopropenyl toluene melts at around −18° or −19° C., it can either be dissolved in a solvent or it can be suspended in an inert liquid medium, e. g., perfluorocarbons, and polymerization effected in solution or in dispersed state. Alternatively, the gaseous boron fluoride can be passed directly through the crystalline mass, thereby enabling polymerization to occur directly in the solid state. The catalyst may be introduced into the isopropenyl toluene directly as a gas or the gaseous boron fluoride may be diluted with various inert materials, e. g., nitrogen or carbon dioxide. The boron fluoride can also be introduced into the reaction mixture as a complex thereof, for instance in the form of boron fluoride-ethyl ether, boron fluoride-acetic acid, boron fluoride-phenol, etc. Or, a boron fluoride-isopropenyl toluene reaction product itself can be used as the polymerization catalyst. Such a so-called "seed" of isopropenyl toluene and boron fluoride-ethyl ether complex is described in Example 1. Through the use of the seed, it is possible to moderate the reaction and to hold the course of polymerization within narrow temperature limits.

Polymeric isopropenyl toluene possesses an unusually high degree of symmetry. Examination of the solid polymers, more particularly those produced as herein described at temperatures below 0° C., e. g., at −20° to −80° C. or lower, by X-ray diffraction methods indicate that such polymers are crystalline, that is, they exhibit sharp lines when examined by diffraction methods. Most polymeric materials are amorphous when examined under such conditions, that is, they yield rather broad halos. However, the solid polymeric isopropenyl toluene exhibits a pattern which is much more characteristic of a crystalline type of polymer. Insofar as the symmetry is concerned, as characterized by the methyl groups, the greatest degree of order is shown by the para-methyl isopropenyl benzene (p-isopropenyl toluene). However, some degree of order also is found in the other methyl-substituted isopropenyl benzenes. If two methyl groups are to be placed in the benzene nucleus, one should be in the para position. In order to accentuate the order more highly, additional methyl groups can be introduced, preferably by copolymerization. In this instance isobutylene copolymers are preferred because of the number and position of the methyl groups.

Another result of the crystallization is shown in the tendency of the polymeric isopropenyl toluene to be insoluble in ordinary solvents. The tendency to reveal sharp lines by X-ray diffraction and poor solubility appear to go together in such a type of product. This follows from the fact that forces which hold the molecule in a crystal form are strong enough to resist the forces which bring about solution.

In order to secure highly crystalline materials, the temperature of polymerization should be such that a polymer having as high a molecular weight as possible can be built up. The more highly polymerized materials can arrange themselves more readily into an ordered pattern. These two factors of size and symmetry are apparently required in order to secure crystallinity; for example, diphenyl ethylene which should lead to the formation of a crystalline symmetrical polymer cannot be obtained in this form because at present no method has been found to continue the reaction beyond the dimer. As the dimer of the product is an amorphous liquid at room temperature, the same results are secured when an attempt is made to make and to polymerize para, para'-ditolylethylene.

As indicated hereinbefore, when the polymerization reaction is to be effected at low temperatures, e. g., much below about −15° C., then the isopropenyl toluene preferably either is dissolved in a suitable anhydrous liquid solvent or is dispersed in a suitable liquid dispersion medium, and the polymerization of the isopropenyl toluene is effected in solution or dispersed state. This procedure is desirable, for one reason, because of the temperature at which the monomeric isopropenyl toluene crystallizes, which temperature, in the case of p-isopropenyl toluene, is around −18° −19° C. Illustrative examples of solvents that may be employed are trifluorotrichloroethane, difluorotetrachloroethane, benzotrifluoride, toluene, xylene, ethyl ether, heptane, octane, isoöctane, nonane, etc. In all cases the solvents or diluents (dispersion media) employed are those which do not crystallize or solidify at the temperature of polymerization.

Any suitable means may be employed in securing a desired low temperature for carrying out the polymerization reaction. Temperatures of the order of −78° to −80° C. can be obtained, for example, by using a solid carbon dioxide-acetone bath. Temperatures below −80° C. may be used, if desired, for instance as low as −100° C. or even as low as −125° C., but such lower temperatures are more difficult and costly to obtain and no particular advantage appears to accrue from their use.

The following examples in which the proportions are in parts by weight are given by way of illustration and not by way of limitation. The boron fluoride-ether solution comprises a boron fluoride-ethyl ether complex which contains approximately 45% of combined boron fluoride.

*Example 1*

| | Parts |
|---|---|
| p-Isopropenyl toluene | 200 |
| Boron fluoride-ether complex | 1 to 2 |

The isopropenyl toluene is placed in a glass vessel or glass-lined vessel provided with an agitator. The boron fluoride-ether complex is added slowly to the isopropenyl toluene, the temperature of which is at or below about +25° C., thereby producing a strong exothermic reaction. The solution thickens rapidly and becomes brownish in color. This product is useful as "seed" for inducing the polymerization of isopropenyl toluene at a rate somewhat slower than that of the polymerization of the isopropenyl toluene according to this example.

*Example 2*

Twenty-three hundred (2300) parts of p-isopropenyl toluene is placed in a suitable reaction vessel, preferably glass or glass-lined and provided with an agitator. The "seed" produced according to Example 1 are added slowly to the isopropenyl toluene, the temperature of which is at or below about +25° C. Usually the "seed" will start the reaction but if they are not sufficiently active, about 1 part of the boron fluoride-ether complex may be added. During the polymerization the temperature rises to about 110° C. and the solution becomes thick and brown-colored. The thickened solution comprising polymeric p-isopropenyl toluene is allowed to cool to room temperature, washed with water (whereby the catalyst is hydrolyzed), and steam distilled until substantially all of the volatile material has been removed. The residue is separated from the water and heated to about 110° C. to remove suspended water, after which it is dried and filtered. The refractive index of the resulting thick, liquid, polymeric product is about 1.5638.

*Example 3*

One hundred and thirty-five (135) parts of "seed" prepared according to Example 1 are added slowly to about 2300 parts of p-iso-propenyl toluene while agitating the latter. During the addition the temperature of the mass rises from an initial temperature of about 16° C. to about 95° C. Part of the isopropenyl toluene polymerizes to a thick, white mass whereas the other part which is near the agitator is in the form of a viscous, light-brown liquid. The entire polymerized mass comprising polymeric p-isopropenyl toluene is permitted to cool, washed with water, steam distilled until substantially all of the volatile matter has been removed, and separated from the water. In order to remove the water which remains in the paste-like mass, the latter is agitated vigorously and the remainder of the water is removed by subjecting the mass to reduced pressure. The product comprising polymeric p-isopropenyl toluene is a thick, gelatinous, white material having about the consistency of ordinary cup grease.

*Example 4*

About 56 parts of "seed" prepared according to Example 1 are added slowly with agitation to about 2300 parts of p-isopropenyl toluene. The isopropenyl toluene is cooled, preferably by surrounding the reaction vessel with ice, and is at a temperature of the order of 0° C. prior to the addition of the seed thereto. After reacting under these conditions for about 16 hours, during which time the temperature of the mass is around 0° C. or slightly above, the ice is permitted to melt over a period of about 8 hours and the reaction mass is allowed to warm to room temperature (about 25° C.). The semi-hard paste thus obtained is washed with water, the volatile materials are stripped with steam and the catalyst-free polymeric product is dehydrated as described under Example 3. The final product comprising p-isopropenyl toluene is a slightly tacky paste.

*Example 5*

About 1260 parts of a product prepared according to Example 4 is successively extracted with four portions of about 500 parts each of methanol. The polymer is agitated with the alcohol in order to obtain a good extraction, after which the alcohol is decanted. This extraction removes the lower molecular weight polymers of p-isopropenyl toluene from the polymeric mass. The residual polymer is filtered, washed with methanol and air-dried. The dried polymer is a fine, granular powder characterized by a crystalline form when examined by X-ray diffraction methods. It melts to form a semi-fluid mass at about 200° C.

The granular polymer is dissolved in carbon tetrachloride to form a rather thick gelatinous mass having a solid content of about 25%. Similar solutions are obtained by the use of other organic solvents, e. g., cyclohexane. Coatings of the polymer solution or of the molten polymer dry or solidify, respectively, to form non-tacky films. Accordingly, the products prepared according to this example may be used for hot-melt applications on paper, textiles, metal and the like. Solutions of the products prepared according to this example also may be used for coating or impregnating paper, textiles, metal, leather, etc.

The methanol extracts may be concentrated to yield viscous, liquid products comprising polymeric p-isopropenyl toluene of lower molecular weight (e. g., dimers, trimers, etc.).

Instead of using a water-miscible alcohol, specifically methanol, as an extractant as above described we may employ a water-miscible ketone, e. g., acetone, or first an alcohol and then a ketone, or a mixture of a water-miscible alcohol and a water-miscible ketone, e. g., a mixture of methyl alcohol and acetone.

*Example 6*

Toluene solutions each containing about 1 per cent by weight of the polymeric compositions produced according to each of Examples 2, 3, 4 and 5 are prepared. The relative viscosities of these solutions are determined by the use of a modified Ostwald viscosimeter (A. S. T. M. Standards 1939, Part III, 652). The following table shows the results obtained and also the approximate number of polymerization units (recurring units) in the polymers.

| Composition | Time | Relative Visc. | Polymerization Units |
|---|---|---|---|
| Toluene | 72.9 | | |
| Product of Ex. 2 | 73.2 | 1.004 | 2+ |
| Product of Ex. 3 | 73.8 | 1.012 | 6+ |
| Product of Ex. 4 | 74.3 | 1.020 | 11− |
| Product of Ex. 5 | 77.3 | 1.060 | 31 |

*Example 7*

| | Parts |
|---|---|
| p-Isopropenyl toluene | 20 |
| Toluene | 80 |

A solution of the isopropenyl toluene in toluene is dried and then cooled to below 0° C., more particularly to about −78° C. About 0.3 part of boron fluoride-ether complex is added in three equal portions with a sufficient time interval between each addition to permit the temperature, which rises because of the exothermic reaction, to fall again to about −78° C. The polymerizable mixture is maintained below 0° C., more particularly at about −78° to −80° C. for about 4 days, after which time the polymeric p-isopropenyl toluene is dispersed throughout the solution. After air-drying, a white, powdery polymer is obtained. The polymer is washed with methanol, thereby removing the cataylst and polymers of p-isopropenyl toluene of lower molecular weight. The washed polymer does not melt at a temperature of about 200° C. as in the case of the product prepared according to Example 5, but instead it merely softens. It shows a highly crystalline form when examined by X-ray diffraction methods.

Example 8

Equal parts of a polystyrene resin (the approximate molecular weight being 100,000) and a liquid polymeric p-isopropenyl toluene produced according to Example 2 are heated together to about 140° C. to form a homogeneous solution. The resinous solution thus formed is dissolved in gasoline containing a trace of an aromatic hydrocarbon, e. g., benzene. The composition of this solution is about 50 parts of polystyrene, 50 parts of polymerized p-isopropenyl toluene and about 300 parts of gasoline. This solution may be applied to various materials such as paper, cloth, metal, etc., and baked to form a clear, tough, flexible film having valuable water-resistant and electrically insulating properties. Polymerized p-methyl styrene or a copolymer of an isopropenyl toluene and styrene or a copolymer of an isopropenyl toluene and p-methyl styrene may be substituted for all or part of the polystyrene used in this example.

Example 9

Thirty (30) parts of polystyrene and 70 parts of p-isopropenyl toluene polymerized according to Example 2 are heated together and dissolved in gasoline. The resulting solution is a permanently tacky liquid which may be used as a pressure adhesive or for other adhesive purposes in connection with textiles, paper, leather, etc.

Example 10

Thirty (30) parts of a 10% solution of polystyrene in p-isopropenyl toluene is cooled to a temperature of the order of 0° C. by surrounding a vessel containing the same with ice. To this solution about 0.6 part of boron fluoride-ether complex is added with agitation. A strong exothermic reaction occurs as the solution thickens and becomes dark brown. The solution is allowed to cool to room temperature and then blown with steam. Upon cooling, a light-colored, sticky composition which is useful as, for example, an adhesive is obtained.

Under the polymerization conditions employed, all the available evidence shows that reaction occurs between the polymeric styrene and the isopropenyl toluene; that is, the reaction is not exclusively direct polymerization of the unsaturated compound, but the unsaturated compound combines chemically with the polymeric styrene through direct ring alkylation or addition to the residues of the benzene ring in the polymeric molecule. The material therefore properly may be described as being a product of conjoint polymerization and ring-addition reactions between p-isopropenyl toluene and polymerized styrene.

Example 11

A fraction of the polymer produced according to Example 2, which boils at 135°–145° C. at about 1 mm. of mercury absolute pressure is a colorless, relatively fluid liquid. This fraction may be obtained by fractional distillation of the aforesaid polymer at low pressure, as well as another fraction having a boiling point of about 170°–180° C. at about 1 mm. of mercury absolute pressure. This latter fraction is of a thick, greasy consistency.

The power factor and dielectric constant at 60 cycles of the low boiling fraction is shown in the following table:

| Temperature, °C. | Dielectric Constant | Power Factor |
|---|---|---|
| 23 | 2.50 | 0.00037 |
| 50 | 2.46 | 0.00114 |
| 70 | 2.44 | 0.00213 |
| 98 | 2.41 | 0.00620 |

The following table shows the dielectric constant and power factor at 60 cycles of the original, unfractionated polymer:

| Temperature, °C. | Dielectric Constant | Power Factor |
|---|---|---|
| 31 | 2.48 | 0.00283 |
| 50 | 2.46 | 0.00099 |
| 73 | 2.43 | 0.00498 |
| 105 | 2.49 | 0.03824 |

These tables indicate that both the fractionated and unfractionated materials are useful as electrically insulating oils, as impregnating media in cable coverings, and for other electrically insulating applications.

Example 12

The still residue from the fractional distillation of Example 11 is dissolved in a drying oil, e. g., linseed oil, tung oil, etc., to form drying oil compositions which may be used for coating paper, cloth, wood, metal or other materials. Such compositions may contain, in addition, any of the ingredients of a coating composition, e. g., a pigment, drier, volatile solvent, plasticizer, a natural or synthetic resin, etc.

Example 13

The polymeric fraction boiling at 135°–145° C. at about 1 mm. of mercury absolute pressure prepared in accordance with Example 11 is subjected to catalytic reduction in the presence of a Raney nickel catalyst. Hydrogen is absorbed at room temperature and partial saturation of the olefinic bonds occurs. At a temperature of about 80° C. substantially complete saturation of the olefinic bonds is obtained. The completely hydrogenated product is slightly less viscous and has a lower refractive index than the original material prior to hydrogenation as shown in the following table:

|  | Relative Viscosity | $n_D^{25}$ |
|---|---|---|
| Original | 15–16 | 1.5597 |
| Reduced | 13–14 | 1.5481 |

The viscosity in Saybolt seconds of the hydrogenated oil is shown in the following table:

| Temperature, °F. | Secs. |
|---|---|
| 34 | 855.0 |
| 100 | 72.8 |
| 212 | 35.5 |

Example 14

A composition prepared according to Example 2 is successively extracted (1) four times with a solution containing equal volumes of methanol and ethanol, (2) with a hot solution (60°–78° C.) of ethanol and (3) with acetone. Each of the extracts is evaporated, leaving the polymer as a residue.

The following table shows the refractive index and viscosity of the extracted materials:

| Extract No. | $n_D^{25}$ | Viscosity (Gardner-Holdt) |
|---|---|---|
| 1-a | 1.5595 | B. |
| 1-b | 1.5632 | E. |
| 1-c | 1.5631 | E. |
| 1-d | 1.5427 | D.–E. |
| 2 | 1.5652 | R. |
| 3 | | Soft, sticky, semi-solid polymer. |

Example 15

Boron fluoride gas is passed into p-isopropenyl toluene which is maintained at about room temperature (about 25° C.), resulting in a strong exothermic reaction. A relatively dark, brown-colored, polymeric material is obtained which has about the same consistency as the product prepared according to Example 2. The boron fluoride gas is somewhat more effective in inducing polymerization than the boron fluoride-ether complex.

Example 16

A mixture of about 30 parts of an unsaturated aliphatic hydrocarbon, specifically isobutylene, and about 30 parts of an isopropenyl toluene, more particularly p-isopropenyl toluene, is cooled in a suitable reaction vessel surrounded by a Dry Ice-acetone (solid carbon dioxide-acetone) bath. When the temperature reaches about —80° C., boron fluoride gas is bubbled through the mixture, causing an exothermic reaction to occur immediately. The temperature rises to —60° C. very quickly and, upon introducing additional boron fluoride gas into the reaction mass, the temperature rises to —30° C. A soft, gummy polymer is formed. After keeping the reaction mass in the Dry Ice bath for about 64 hours it is permitted to warm to room temperature. Some unreacted isobutylene is evolved as the mass warms. The copolymer of isobutylene and p-isopropenyl toluene is in the form of a pasty, sticky mass. This copolymer may be purified, for instance, by washing with an alcohol (e. g., methyl or ethyl alcohol), to yield a flaky, white, solid copolymer of the aforementioned ingredients, which copolymer is insoluble in hexane, butyl acetate and acrylonitrile and only partially soluble in acetone, ethylene dichloride and benzene.

The impure, pasty copolymeric mass may be boiled in acetone for several minutes, filtered and dried, thereby producing a purified white, powdery copolymer which is useful for fiber applications or uses either before or after drawing. This material also may be molded by subjecting it to a pressure of about 2000 pounds per square inch in a mold maintained at about 150° C. for about 2 minutes. An opaque, white, molded article is obtained. The acetone filtrate may be evaporated to leave as a residue a viscous, sticky material comprising a p-isopropenyl toluene-isobutylene copolymer of lower molecular weight. This material is useful in adhesive applications.

Instead of using equal parts of an isoölefin, specifically isobutylene, and an isopropenyl toluene, more particularly p-isopropenyl toluene, as shown in the above illustrative example, copolymers may be similarly produced by polymerizing mixtures containing various other proportions of these ingredients, for instance mixtures of, by weight, from 5 to 95 parts of the isoölefin and from 95 to 5 parts of the isopropenyl toluene, more particularly from 20 to 80 parts of the isoölefin and from 80 to 20 parts of the isopropenyl toluene.

Example 17

Into each of four 12" x 1½" glass tubes is placed a solution of 75 parts of redistilled toluene and 25 parts of p-isopropenyl toluene which has been freshly steam distilled and dried over a desiccant, specifically anhydrous calcium sulfate. These glass containers are closed with stoppers having openings for the introduction of catalyst and dry carbon dioxide, which latter in some cases is swept over the contents of the tubes during polymerization. Other tubes are exposed to the air during polymerization, moisture being excluded by means of a drying tube filled with anhydrous calcium sulfate desiccant. The tubes containing the solution of p-isopropenyl toluene in toluene are cooled for 1 hour at a temperature substantially below 0° C., more particularly at about —78° C. Thereafater a catalyst comprising a boron fluoride-ether complex is added and the polymerization is allowed to proceed at —78° C. After polymerization has proceeded for a while, polymerization is interrupted by adding the contents of the tubes, while still cold, to a large volume of methanol. The impure polymer that precipitates is filtered off and purified by treatment with hot methanol, thereby extracting the polymers of lower molecular weight, followed by drying in a vacuum oven at 100° C. The solid polymeric p-isopropenyl toluene produced in this manner is insoluble in toluene, cyclohexane, ethylene dichloride and chlorobenzene. Data on the polymerization conditions and the results obtained on four tests are shown below:

| Parts of Catalyst | Atmosphere | Polymerization Time in Hours | Percentage Yield of Polymer |
|---|---|---|---|
| 1.65 | Air | 23 | 21.2 |
| 1.65 | do | 42 | 36.8 |
| 1.65 | Carbon dioxide | 89 | 80.4 |
| 0.55 | do | 89 | 19.6 |

Example 18

Same as Example 17 with the exception that the boron fluoride-ether complex is used in an amount corresponding to 6.6% by weight of the p-isopropenyl toluene, which latter is material that has been steam distilled from a mixture thereof with resorcinol in order to free the hydrocarbon of aldehydic impurities, and then dried over anhydrous calcium sulfate desiccant. In all cases the time of polymerization is 91 hours. The other polymerization conditions and results are shown below:

| Percent by Weight of Monomer in Toluene | Percentage Yield of Polymer | Plasticity,[1] Inches Flow in 2 Minutes |
|---|---|---|
| 25 | 28.8 | No flow |
| 40 | 31.6 | No flow |
| ²50 | 25.6 | 0.10 |

[1] The plasticity is determined on a Peakes-Rossi machine at 175° C. and pressure of 3,000 pounds per square inch.
² At this concentration the monomeric p-isopropenyl toluene crystallizes from solution when cooled to —78° C.

Example 19

Into a 3-necked reaction vessel fitted with a sealed stirrer, drying tube and thermometer are placed 480 parts of dry toluene and 320 parts of p-isopropenyl toluene which has been steam distilled and dried as described under Example 18. The vessel and contents are cooled to substantially below 0° C., specifically to about —78° C., after which about 20 parts of boron fluoride-ether complex is stirred into the reaction mass. Polymerization is allowed to proceed for 87½ hours at about —78° C., except for the last few hours of this period when the temperature rises to about —45° C. To the reaction mass, which is a solid at this temperature due to the precipitated polymeric p-isopropenyl toluene, is added a large volume of methanol. The solid polymer is filtered off, the larger lumps broken up, and then treated with about 800 parts of boiling methanol. This treatment extracts the lower molecular weight polymers of p-isopropenyl toluene. The higher molecular weight polymers are washed with additional methanol and then dried in a vacuum oven at 105° C. The dried polymer, which is obtained in a yield amounting to 59%, has a flow of 0.7 inch in 2 minutes when tested for plasticity in a Peakes-Rossi machine at 175° C. under a pressure of 3000 pounds per square inch.

Example 20

In a stainless steel vessel equipped with a dropping funnel, thermometer and a stainless steel stirrer is placed 500 parts of p-isopropenyl toluene. Five-tenths part of the boron fluoride-ethyl ether complex is added to the isopropenyl toluene, which is at a temperature of about 26° C., and the mass is stirred. After 13 minutes the exothermic reaction causes the temperature to rise to 69° C., and more monomeric isopropenyl toluene is added at such a rate as to maintain the temperature at approximately 70° C. Additional small portions of the catalyst are added from time to time, the total amount of the catalyst added being approximately one part. A total of 1500 parts of the monomeric isopropenyl toluene is added over a period of 53 minutes.

When the temperature of the reaction mass has fallen to 60° C., steam stripping is begun and continued exhaustively until the organic phase of the distillate has a refractive index of $n_D^{23}$ 1.5577. The steam-stripped polymer is dried by simultaneously heating and blowing with carbon dioxide. Seventeen hundred and fifty parts of a nearly colorless liquid product comprising polymeric p-isopropenyl toluene is obtained. This product has a refractive index of $n_D^{23}$ 1.5645 and a Gardner-Holdt viscosity of F, which corresponds to a viscosity of approximately of 1.4 poises.

Example 21

Alpha-methyl styrene (isopropenyl benzene) and p-isopropenyl toluene are each steam distilled from a 3% solution of sodium hydroxide and then dried over anhydrous calcium sulfate. Solutions of 25 parts of each of the above monomers dissolved in 75 parts of redistilled toluene re placed in clean, dry glass tubes. The tubes are stoppered with two-hole stoppers. One of the holes is plugged except during the addition of the catalyst while the other hole, which serves as a vent, is protected with a magnesium perchlorate drying tube. The tubes are then cooled in a Dry Ice-acetone bath to a temperature of approximately —78° to —80° C. After cooling for one and one-half hours, 0.2 part of boron fluoride-ethyl complex is added; the tubes are shaken to insure thorough mixing and cooling is continued. After 24 hours, an additional 0.2 part of the boron fluoride-ethyl ether complex is added to each of the tubes, and after an additional 24 hours 0.3 part of the same catalyst dissolved in two parts of toluene is added. After polymerization has proceeded at this low temperature for a total of 72 hours, further cooling is discontinued. At the end of the polymerization period, a clear, extremely viscous solution of polymeric alpha-methyl styrene dissolved in the toluene is obtained. In marked contrast, the polymer of p-isopropenyl toluene is a hard, opaque, wax-like solid which is insoluble in the toluene.

One hundred parts of methanol is added to each of the tubes and thoroughly mixed with the polymeric mass. The resulting mixtures are then transferred to vessels containing additional methanol. The polymer of alpha-methyl styrene is thoroughly coagulated and the polymeric p-isopropenyl toluene is broken up. The polymers are then extracted with hot, fresh methanol, after which they are filtered off and dried for 16 hours at 60° C. in a vacuum oven. When tested for solubility in toluene, the polymeric alpha-methyl styrene, which is a white crumbly solid, is completely soluble in the toluene, whereas the polymer of p-isopropenyl toluene, which is a hard white granular solid, is insoluble therein.

When X-ray diffraction patterns of the two polymers are determined, it is found that the polymeric alpha-methyl styrene shows a broad halo which is indicative of an amorphous product. In marked contrast, the diffraction pattern of the polymeric p-isopropenyl toluene contains relatively sharp concentric rings indicating a high degree of crystallinity in the polymer. Similar results are obtained when the polymerization of the alpha-methyl styrene and the p-isopropenyl toluene is effected at somewhat higher temperatures, e. g., at temperatures ranging from —60° to —20° C. When the polymerization is carried out at a temperature above about —20° C., e. g., at about 0° C., the polymeric mass contains a larger proportion of polymers of lower molecular weight. These lower molecular weight polymers can be extracted from the polymeric mass of p-isopropenyl toluene, e. g., by treatment with hot acetone, leaving a mass comprising essentially polymeric p-isopropenyl toluene, which exhibits a crystalline structure when examined by X-ray diffraction methods. On the other hand, alpha-methyl styrene when similarly polymerized and extracted, leaves a polymeric mass showing no comparable sharp lines on X-ray examination.

The foregoing results show conclusively that alpha-methyl styrene and an isopropenyl toluene, specifically p-isopropenyl toluene, are non-equivalent when polymerized by the method used in practicing our invention.

It will be understood, of course, by those skilled in the art that our invention is not limited to the particular reactants or to the particular conditions of reaction given in the above illustrative examples. Thus instead of p-isopropenyl toluene we may use o- or m-isopropenyl toluene. Likewise instead of using a complex of boron fluoride and ethyl ether as a catalyst for the reaction we may use any other boron fluoride type of ansolvo acid, for instance a complex of boron fluoride and various other ethers, e. g., dipropyl ether, dibutyl ether, etc., or we may use a complex of boron fluoride and various acids, e. g., hydrofluoric acid, acetic acid, etc., or of boron fluoride and a phenol, e. g., phenol itself, etc., as well as other catalytic complexes of boron fluoride, all of which engender boron fluoride. It will also be understood that in the various examples wherein a boron fluoride-ether complex has been used as a catalyst we may employ boron fluoride gas with equally satisfactory results. The boron fluoride when used in the form of a gas or in the form of a boron fluoride complex is readily removed from the polymeric mass merely by washing the mass with water or by treatment with an alcohol, a ketone, or a mixture of an alcohol and a ketone or by treatment first with an alcohol and then with a ketone. When other catalysts are employed, e. g., aluminum chloride, ferric chloride, sulfuric acid, etc., there is greater difficulty in removing the catalyst from the polymeric mass.

Various solvents may be employed in purifying the polymerized isopropenyl toluene but we prefer to employ a water-miscible solvent, for instance a water-miscible alcohol (e. g., methyl, ethyl, propyl, isopropyl, sec.-butyl, tert. butyl, allyl, methallyl, etc., alcohols); a water-miscible ketone (e. g., acetone, methyl ethyl ketone, etc.); or mixtures of such water-miscible alcohols and ketones.

Depending upon the particular conditions of polymerization the polymerized isopropenyl toluene varies in properties from slightly viscous liquids to solids of medium or high molecular weight. The relatively low molecular weight liquids usually result when polymerization is effected at a relatively high temperature, e. g., at a temperature at or approaching 110° C., while the higher molecular weight solids are obtained when the polymerization is carried out at a low temperature, e. g., at temperatures substantially below room temperature (about 25° C.), more particularly at temperatures below about 0° C.

The isopropenyl toluene may be polymerized by a continuous process as well as by batch operation. Thus the isopropenyl toluene containing a trace of catalyst (e. g. a boron fluoride-ether complex or a "seed" produced as hereinbefore described) may be passed through a conduit with alternate hot and cool zones.

The polymerized isopropenyl toluene may be hydrogenated if desired with any suitable hydrogenation catalyst, e. g., a Raney nickel catalyst. The hydrogenation is carried out at temperatures ranging, for example, from about 20° C. to about 100° C. At such temperatures the aromatic double bonds in the polymer are not affected whereas the olefinic double bonds are saturated by the hydrogenation treatment. If it be desired to saturate the aromatic double bonds this may be done, for example, by using a higher temperature during the hydrogenation, for instance, temperatures of the order of 175° to 250° C.

The products of this invention are suitable for a wide variety of industrial applications. Thus the polymers as initially obtained and the hydrogenated polymers, especially the dimer and the hydrogenated dimer of isopropenyl toluene, are suitable in various electrically insulating applications, as lubricants, e. g., as fiber lubricants, and for various other purposes. For instance the dimer and the other viscous sticky polymers are useful as pressure adhesives or for other adhesive purposes. The polymers of high molecular weight are useful in coating compositions as well as in compositions employed as impregnants for paper, textiles and other sheet materials. Emulsions of the polymeric materials of this invention, either alone or with other modifying bodies, e. g., resinous materials, may be utilized in treating textiles, in textile printing, in treating paper, especially where it is desired to improve the water vapor resistance and water resistance of the paper, and in similar applications. Such emulsions may be either of the oil-in-water type or of the water-in-oil type. The lower molecular weight polymers of this invention also may be employed as plasticizers for resins and other materials having insufficient plasticity or flow characteristics.

The polymers which are normally solid at ordinary room temperature may be used in molding or casting compositions, either alone or modified with other resinous materials. If desired such compositions also may contain any suitable dye, pigment, or lake as well as a filler, plasticizer or other modifying ingredient which conventionally is employed in such compositions.

The liquod polymeric isopropenyl toluene may be employed alone as insulating oils or as impregnants for cable coverings, or they may be admixed with other suitable dielectric material, e. g., the chlorinated diphenyls. The polymers, especially the hydrogenated polymers, may be chlorinated if desired. The resulting chlorinated product then may be mixed with chlorinated diphenyls, and the resulting mixture used for dielectric purposes. Alternatively, the chlorinated products may be fluorinated and used alone or admixed with other dielectric materials as electrical insulation. The polymers of this invention also may have polymeric styrene incorporated therewith to yield a mixture or solution of polymeric styrene and polymeric isopropenyl toluene.

Our polymeric materials and hydrogenated products thereof may be employed as modifiers for natural and synthetic rubber, paraffin, natural waxes, etc., as well as in the synthesis of various organic compounds, e. g., by nitration, sulfonation, chlorination, fluorination and the like.

What we claim as new and desire to secure by Letters Patent of the United States is:

1. The method of preparing polymeric materials which comprises polymerizing, in the absence of a terpene and at a temperature not higher than about 110° C., a polymerizable composition containing an isopropenyl toluene and, as a catalyst for the polymerization, a seed obtained by treating an isopropenyl toluene with a catalyst selected from the class consisting of boron fluoride and complexes of boron fluoride, the isopropenyl toluene contained in the said polymerizable composition being the only aromatic compound having an unsaturated aliphatic substituent attached to the aromatic nucleus that is present in the said composition.

2. The process of preparing polymeric materials characterized by a crystalline form when examined by X-ray diffraction methods, said process comprising polymerizing, at a temperature not exceeding about 0° C., a polymerizable composition in which an isopropenyl toluene is the sole polymerizable monomer with the aid of a catalyst which is a seed obtained by treating an isopropenyl toluene with a boron fluoride-ethyl ether complex.

3. A process as in claim 1 wherein the isopropenyl toluene component of the polymerizable composition and used in forming the seed catalyst is p-isopropenyl toluene.

4. The process of preparing polymeric materials which comprises polymerizing, at a temperature within the range of —80° to +110° C., a polymerizable composition in which an isopropenyl toluene is the sole polymerizable monomer with the aid of a catalyst which is a seed obtained by treating an isopropenyl toluene with a catalyst selected from the class consisting of boron fluoride and complexes of boron fluoride, treating the resulting polymeric mass with a water-miscible alcohol, and separating the purified polymeric material from the alcohol-treated mass.

5. The process of preparing polymeric materials which comprises polymerizing, at a temperature within the range of —80° to +110° C., a polymerizable composition in which an isopropenyl toluene is the sole polymerizable monomer with the aid of a catalyst which is a seed obtained by treating an isopropenyl toluene with a catalyst selected from the class consisting of boron fluoride and complexes of boron fluoride, treating the resulting polymeric mass with a water-miscible ketone, and separating the purified polymeric material from the ketone-treated mass.

6. The process of preparing polymeric materials which comprises polymerizing, at a temperature within the range of —80° to +110° C., a polymerizable composition in which an isopropenyl toluene is the sole polymerizable monomer with the aid of a catalyst which is a seed obtained by treating an isopropenyl toluene with a catalyst selected from the class consisting of boron fluoride and complexes of boron fluoride, treating the resulting polymeric mass with a water-miscible alcohol and a water-miscible ketone, and separating the purified polymeric material from the thusly treated mass.

7. The process of preparing polymeric materials which comprises polymerizing, at a temperature not exceeding about 110° C., a polymerizable composition containing an isopenyl toluene as the sole polymerizable monomer and, as a catalyst for the said polymerization, a seed obtained by treating an isopropenyl toluene with a catalyst selected from the class consisting of boron fluoride and complexes of boron fluoride.

8. The process of preparing polymeric materials which comprises polymerizing, at a temperature not exceeding about 0° C., a polymerizable composition containing p-isopropenyl toluene as the sole polymerizable monomer and, as a catalyst for the said polymerization, a seed obtained by treating p-isopropenyl toluene with a catalyst comprising a boron fluoride-ethyl ether complex.

9. The method of preparing polymeric materials which comprises treating, at a temperature not exceeding about 110° C., a polymerizable composition containing (1) an isopropenyl toluene as the sole polymerizable monomer and (2) another material which is a polystyrene, the said isopropenyl toluene and polystyrene being capable of undergoing a ring-addition reaction, and the said polymerizable composition being treated at the said temperature with a seed obtained by treating an isopropenyl toluene with a catalyst selected from the class consisting of boron fluoride and complexes of boron fluoride, whereby reaction is effected between the isopropenyl toluene of (1) and the polystyrene of (2).

10. The method of preparing polymeric materials which comprises treating, at a temperature not higher than about 0° C., a polymerizable composition containing (1) p-isopropenyl toluene as the sole polymerizable monomer and (2) polystyrene, the said polymerizable composition being treated at the said temperature with a seed obtained by treating an isopropenyl toluene with a catalyst selected from the class consisting of boron fluoride and complexes of boron fluoride, whereby reaction is effected between the p-isopropenyl toluene of (1) and the polymerized styrene of (2).

ARTHUR S. NYQUIST.
EDWARD L. KROPA.

REFERENCES CITED

The following references are of record in the file of this patent:

UNITED STATES PATENTS

| Number | Name | Date |
| --- | --- | --- |
| 2,249,987 | Stanley | July 22, 1941 |
| 2,283,236 | Soday | May 19, 1942 |
| 2,302,464 | Palmer et al. | Nov. 17, 1942 |
| 2,317,878 | Bannon | Apr. 27, 1943 |
| 2,383,084 | Rummelsburg | Aug. 21, 1945 |
| 2,397,093 | Dreyfus et al. | Mar. 26, 1946 |
| 2,436,614 | Sparks et al. | Feb. 24, 1948 |

OTHER REFERENCES

Schulz: Zeit, Physik. Chem., part B, vol. 34, 1936, pp. 208 and 209.

Hersberger: pp. 1073 and 1076, Ind. and Eng. Chem., Nov. 1945.

Beilstein: "Handbuchder Organische Chemie," 4th ed., vol. V, pp. 490 and 654.

Staudinger et al.: pp. 450 and 451, Ber. der, deutschen Chem. Gesell., vol. 62 (1929).

Pp. 52 and 53, Institution of the Rubber Industry—Transactions, vol. 6 (1930).

Sapiro: Chem. Soc. Journal Trans., part 2, 1937, pp. 1784–1787.

Certificate of Correction

Patent No. 2,490,372                                          December 6, 1949

ARTHUR S. NYQUIST ET AL.

It is hereby certified that errors appear in the printed specification of the above numbered patent requiring correction as follows:

Column 1, line 46, for "speciafically" read *specifically*; column 10, line 26, for "Thereafater" read *Thereafter*; column 11, line 67, for "re" read *are*; column 12, line 2, after "fluoride-ethyl" insert *ether*; column 14, line 24, for "liquod" read *liquid*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*